United States Patent
Burrows et al.

(10) Patent No.: US 7,914,277 B1
(45) Date of Patent: Mar. 29, 2011

(54) HEATER HOUSING AND HEATER FOR PLASTIC INJECTION MACHINE NOZZLE

(75) Inventors: Arthur Burrows, Sumter, SC (US); Daniel Haselden, Pamplico, SC (US); Mike Todd, Florence, SC (US)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 12/415,544

(22) Filed: Mar. 31, 2009
(Under 37 CFR 1.47)

(51) Int. Cl.
*B29C 45/20* (2006.01)
(52) U.S. Cl. .................................. 425/547; 425/549
(58) Field of Classification Search .................. 425/547, 425/549
See application file for complete search history.

(56) References Cited

U.S. PATENT DOCUMENTS

| | | | |
|---|---|---|---|
| 5,360,333 A | 11/1994 | Schmidt | |
| 5,558,888 A | 9/1996 | Beck | |
| 5,591,367 A | 1/1997 | Schwarzkopf | |
| 5,955,120 A | 9/1999 | Deissler | |
| 6,410,894 B1 | 6/2002 | Hoffmann et al. | |
| 6,872,068 B2 | 3/2005 | Schwarzkopf et al. | |
| 7,125,243 B2 * | 10/2006 | Sicilia et al. | 425/549 |
| 7,131,833 B2 * | 11/2006 | Babin | 425/549 |
| 7,137,806 B2 | 11/2006 | Babin et al. | |
| 2005/0104242 A1 | 5/2005 | Olaru | |

* cited by examiner

*Primary Examiner* — Tim Heitbrink
(74) *Attorney, Agent, or Firm* — Standley Law Group LLP

(57) ABSTRACT

A plastic injection machine nozzle heater housing and heater. The heater housing includes a heater body having an axial thru-bore for receiving a plastic injection machine nozzle of interest. Bores may extend into the heater body from a rear face thereof for receiving corresponding cartridge heater(s) and a thermocouple. A wire receiving groove may be provided to hold the cartridge heater and thermocouple wires. A wire passage aperture may be provided to permit the cartridge heater and thermocouple wires to extend from the heater body for appropriate connection to a heater controller or other appropriate device. Cartridge heater(s) and a thermocouple are inserted into the corresponding bores and a cover plate of the heater housing is then secured to the end of the heater body so as to cover the heater(s), the thermocouple, and the portion of the associated wires residing in the wire receiving groove.

20 Claims, 3 Drawing Sheets

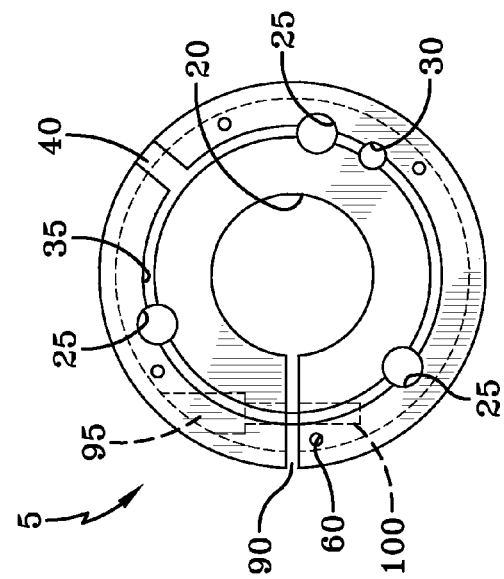
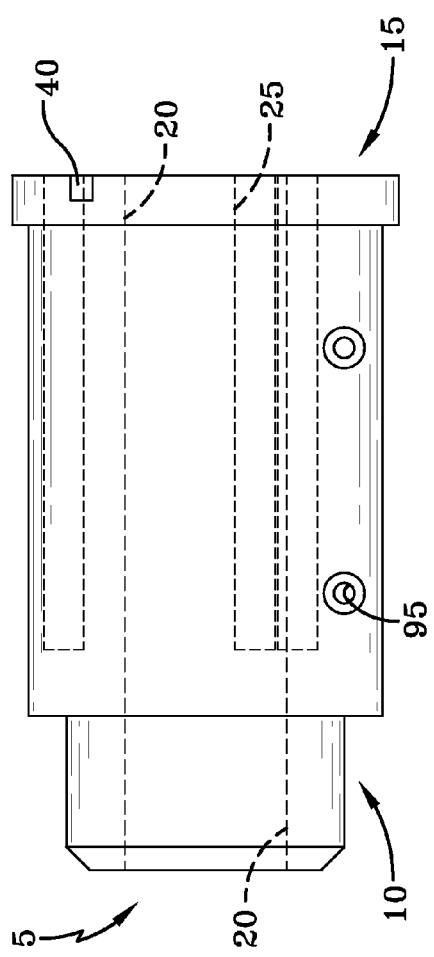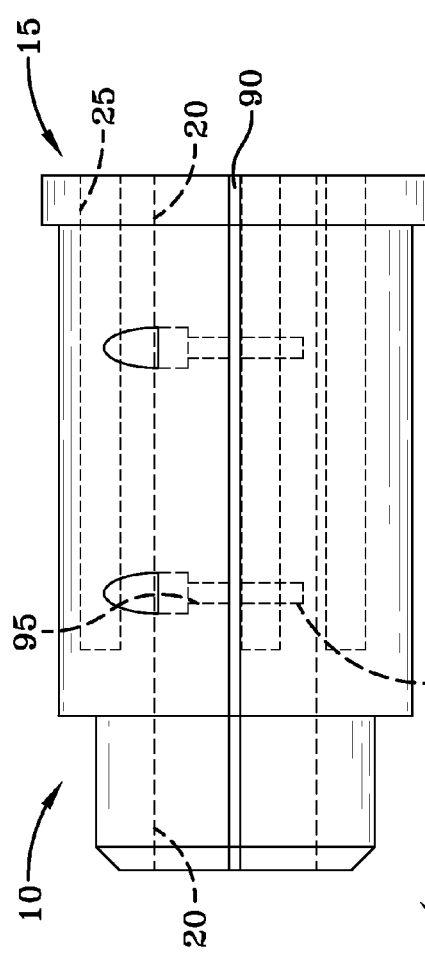

HEATER HOUSING AND HEATER FOR PLASTIC INJECTION MACHINE NOZZLE

BACKGROUND OF THE INVENTIVE FIELD

The present invention is directed to a plastic injection machine nozzle heater housing and heater using said housing. More particularly, the present invention is directed to a plastic injection machine nozzle heater housing and heater of a design that resists plastic buildup and the damage that can result therefrom.

Plastic injection machines typically include a barrel that is fitted with a screw for moving plastic material from a feed throat area to a nozzle. The plastic material is typically supplied to the screw from a material hopper, where some amount thereof is stored and replenished. Plastic material is injected into a mold in a molten state by driving the screw forward in the barrel using an injection cylinder.

As the plastic material is typically supplied to the screw in solid and often, pelletized form, the plastic material must be melted as it travels along the screw and prior to reaching the exit of the nozzle. This melting is normally accomplished by locating a number of heaters along the barrel, including at the nozzle. Melting of the plastic material is than accomplished by the action of the screw on the material and by heat from the heaters that is supplied to the screw through the barrel and nozzle. As long as plastic is present in the nozzle, at least the nozzle heater(s) must typically remain powered on to ensure that the plastic material in the nozzle does not solidify.

The heaters associated with the nozzle of a plastic injection machine are commonly of a band design. A band heater would we well known to one of skill in the art. Briefly, a band heater is a resistance heater that encases a number of resistor wires or other resistor elements in a sheath or casing. A band heater is flexible, at least to the extent that it may be wrapped around the circumference of a plastic injection machine barrel or nozzle and secured in place—usually by passing threaded fasteners through corresponding apertures in each of its free ends. Wires are provided for connecting the band heater to a source of electric power.

The width of an individual band heater is typically fairly limited. Consequently, a number of band heaters must typically be installed along the length of a plastic injection machine barrel, and at least one band heater must normally be installed to a plastic injection machine nozzle. Once installed, the band heaters are commonly connected to a heater controller that regulates the power thereto so as to also regulate the temperature of the associated plastic injection machine barrel and nozzle.

In order to properly control the temperature of a plastic injection machine nozzle, the temperature thereof must first be monitored. Band heaters generally do not provide for any type of inherent temperature monitoring function. As such, a separate thermocouple is commonly installed to a plastic injection machine nozzle, and often in the area of an associated band heater(s). Various types of thermocouples may be used for this purpose, but frequently a bayonet-type thermocouple is employed. Such a thermocouple has a tubular portion that extends into a pocket provided in the plastic injection machine nozzle. Such a thermocouple is commonly held in place with a band clamp that circumnavigates the nozzle. The thermocouple is connected to the heater controller to provide nozzle temperature readings that can be used by the controller to regulate the nozzle temperature (by adjusting the amount of electric power supplied to an associated band heater).

When operating properly, band heaters and separate thermocouples can work acceptably well to produce and maintain a desired nozzle temperature. However, their use on a plastic injection machine nozzle is nonetheless problematic for various reasons.

Locating band heaters and thermocouples as described above on a plastic injection machine nozzle undesirably subjects them to contact with molten plastic. As would be understood by one of skill in the art, molten plastic may flow over or otherwise contact the outside of a nozzle under several circumstances. For example, if there is inadequate sealing contact between the nozzle tip and the sprue bushing of a mold during plastic injection, molten plastic may be reflected backward onto the nozzle. Nozzles also sometimes slowly leak molten plastic due to improper or worn engagement with the barrel of the plastic injection machine. Further, plastic injection machine barrels may have vents that allow for the expulsion of gases that can otherwise build up therein. In addition to emitting gases, these vents may also leak molten plastic that can, if the vent is positioned near enough, flow or be ejected onto the nozzle.

When molten plastic contacts or, as is often the case, covers a band heater or thermocouple assembly, the band heater and/or thermocouple assembly may be damaged or its operation may otherwise be negatively affected. Further, as is also common, if such plastic material is allowed to solidify, it must eventually be removed from the nozzle. The removal process is difficult. Typically, the solidified plastic must be chipped/scraped from the nozzle using a chisel, paint scraper, etc. Solidified plastic may also be removed, or its removal may be assisted, by re-heating the plastic to/near its melting point using a hand-held torch or similar heating device. Unfortunately, many plastic materials may release toxic fumes when heated in this manner. In either case, the removal of solidified plastic from a plastic injection machine nozzle often results in damage to any band heaters and thermocouples attached thereto as described above.

From the foregoing commentary, it can be understood that it would be desirable to make use of a plastic injection machine nozzle heater and thermocouple that is resistant to the adhesion of molten plastic material. It would also be desirable to employ a plastic injection machine nozzle heater that can be easily rid of any plastic material that has solidified on the exterior thereof, while eliminating or minimizing any resulting damage to the heating element(s) and/or thermocouple device(s) therewith. A plastic injection machine nozzle heater housing and heater of the present invention addresses these problems.

SUMMARY OF THE GENERAL INVENTIVE CONCEPT

A plastic injection machine nozzle heater housing of the present invention includes a heater body having an outer surface that resists the adhesion of molten plastic material. A plastic injection machine nozzle heater housing of the present invention also allows for simplified removal of any plastic material that has solidified on the exterior thereof. The design of a plastic injection machine nozzle heater housing of the present also eliminates or minimizes any resulting damage to the heating element(s) and/or thermocouple device(s) associated with the housing when used to form an injection machine nozzle heater.

A plastic injection machine nozzle heater housing of the present invention includes a substantially solid heater body of some length having an axial thru-bore for receiving a plastic injection machine nozzle of interest. Preferably, the outer surface of the nozzle heater body is substantially smooth to resist molten plastic adhesion and to facilitate removal of solidified plastic. To this end, a plastic injection machine nozzle heater body of the present invention is preferably, but not essentially, also of substantially circular cross-section. A plastic injection machine nozzle heater body of the present invention is preferably manufactured of a metal material, such as a tool steel.

At least one and, preferably, a plurality of longitudinal bores, extend into the plastic injection machine nozzle heater body from one end and along lines parallel to its axis. The longitudinal bore(s) are provided to receive corresponding cartridge heaters, which would be familiar to one of skill in the art. Another bore preferably extends into the plastic injection machine nozzle heater body in a similar same manner for receiving a thermocouple.

The end of the plastic injection machine nozzle heater body from which the cartridge heaters and thermocouple are inserted may include a wire receiving groove for holding the cartridge heater and thermocouple wires. A wire passage slot or other wire passage aperture may extend from the outer surface of the plastic injection machine nozzle heater body into the wire receiving groove so as to permit the cartridge heater and thermocouple wires to extend from the body for appropriate connection to a heater controller or other appropriate device.

Cartridge heater(s) and a thermocouple are inserted into the corresponding bores in the plastic injection machine nozzle heater body to form an injection machine nozzle heater. A cover plate of the heater housing is then preferably secured to the end of the heater body so as to cover the heater(s), the thermocouple, and the associated wires residing in the wire receiving groove. The heater and thermocouple wires that extend out through the wire passage slot may be covered with a protective sheath and any voids between the wires and the walls of the wire passage slot may be filled with a sealing material if desired.

Consequently, it can be understood that a plastic injection machine nozzle heater housing and heater of the present invention is of a durable design and construction that presents a substantially smooth and continuous outer surface when installed to a plastic injection machine nozzle. The cartridge heater(s) and the thermocouple are housed within the body portion of the heater housing and, therefore, are protected against damage from molten plastic material or the actions that may be required to remove it from the heater body once it has solidified.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 2a-2c are top plan, side elevation and rear elevation views, respectively, of a heater body portion of FIG. 1.

DETAILED DESCRIPTION OF EXEMPLARY EMBODIMENT(S)

Figure 1:
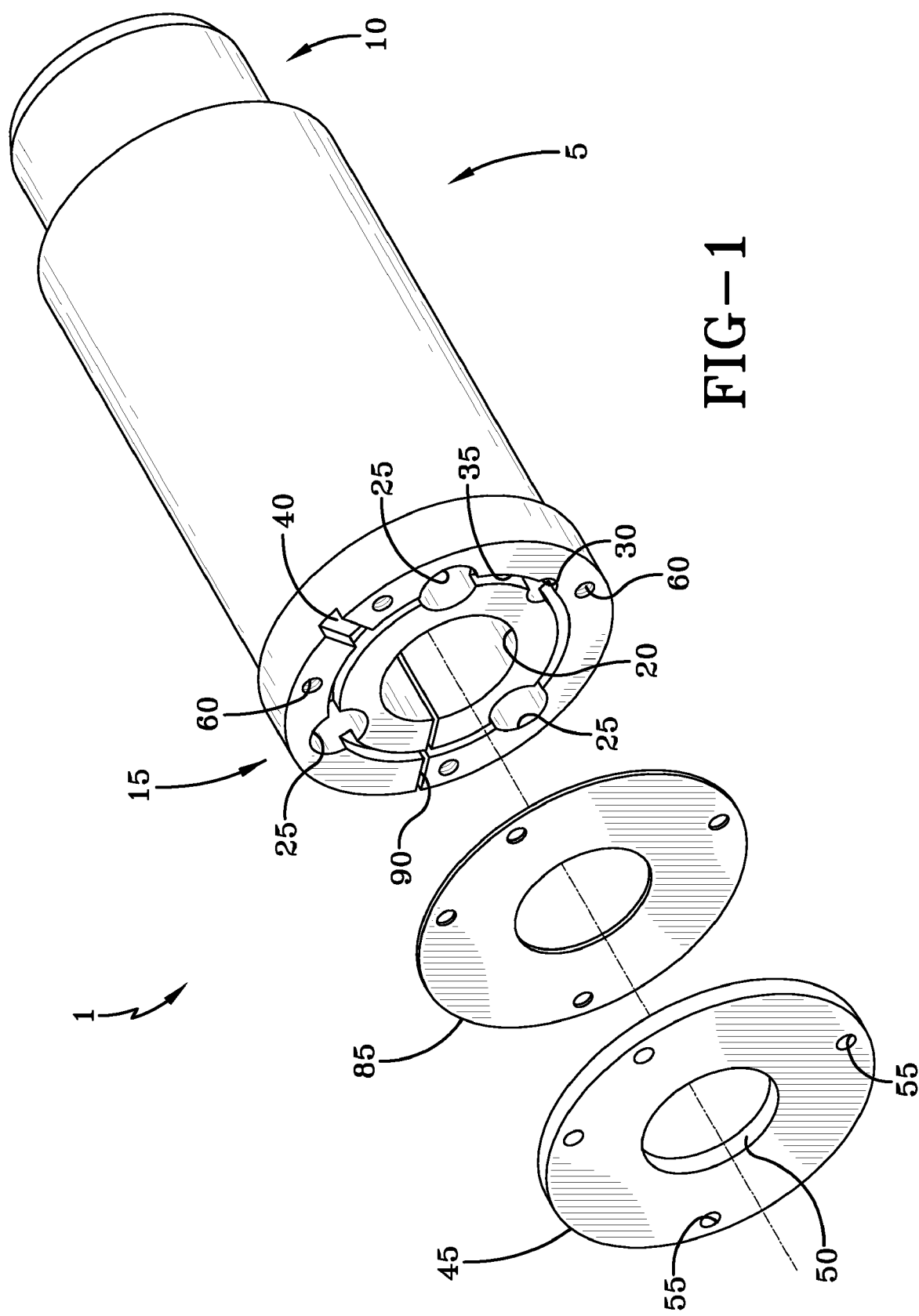
FIG. 1 is a perspective view of one exemplary embodiment of a plastic injection machine nozzle heater housing of the present invention.

One exemplary embodiment of a plastic injection machine nozzle heater housing (heater housing) 1 of the present invention is shown in FIG. 1. The heater housing 1 is shown to include a heater body 5 and an associated cover plate 45. Various other views of the heater body 5 are depicted in FIGS. 2a-2c.

As shown, this particular embodiment of the heater body 5 is designed as a stepped cylinder. While such a design may facilitate installation and removal form a plastic injection machine (injection machine) nozzle, it should be apparent to one of skill in the art that a cylindrical heater body of the present invention may also have a uniform outer diameter. Further, while a heater body of cylindrical shape (i.e., circular cross-section) may best resist adhesion by molten plastic material and facilitate removal of solidified plastic material, a heater body of the present invention may be of other cross-sections.

The heater body 5 has a forward end 10 that is closest to the tip of an injection machined nozzle when installed thereto, and a rearward end 15 from which one or more heaters and a thermocouple are installed, as described in more detail below. In other embodiments, heater and/or thermocouple bores may extend into the heater body from a forward end of thereof, although it is believed that such a design is less protective of associated heaters and thermocouples.

An axial thru-bore 20 passes through the heater body 5, and is of a diameter appropriate to receive a particular injection machine nozzle of interest. The size of the heater body and associated thru-bore may vary depending on the size of the injection machine nozzle to which it will be installed.

This particular embodiment of the heater body 5 includes a radial expansion slit 90 that passes through the heater body wall along the length thereof. As would be understood by one skilled in the art, the use of such an expansion slit 90 facilitates passage of the heater body 5 over an associated injection machine nozzle during installation. Referring to FIGS. 2a-2c, it can be seen that a number of fastener receiving bores 95 are located in this particular embodiment of the heater body 5. Each fastener receiving bore 95 includes a threaded lower portion 100 that allows a slit compression fastener to be installed thereto and used to draw together the expansion slit 90, thereby tightening the heater body 5 around an injection machine nozzle after its initial installation thereto. The number of fastener bores and associated fasteners provided may vary.

In other embodiments of the present invention, clamps (e.g., band clamps) may be wrapped around the heater body 5 as a substitute for the slit compression fasteners. Alternatively, a heater body of the present invention may be constructed from two separate halves that are secured around an injection machine nozzle using fasteners, clamps, etc., as described above.

Figure 3:
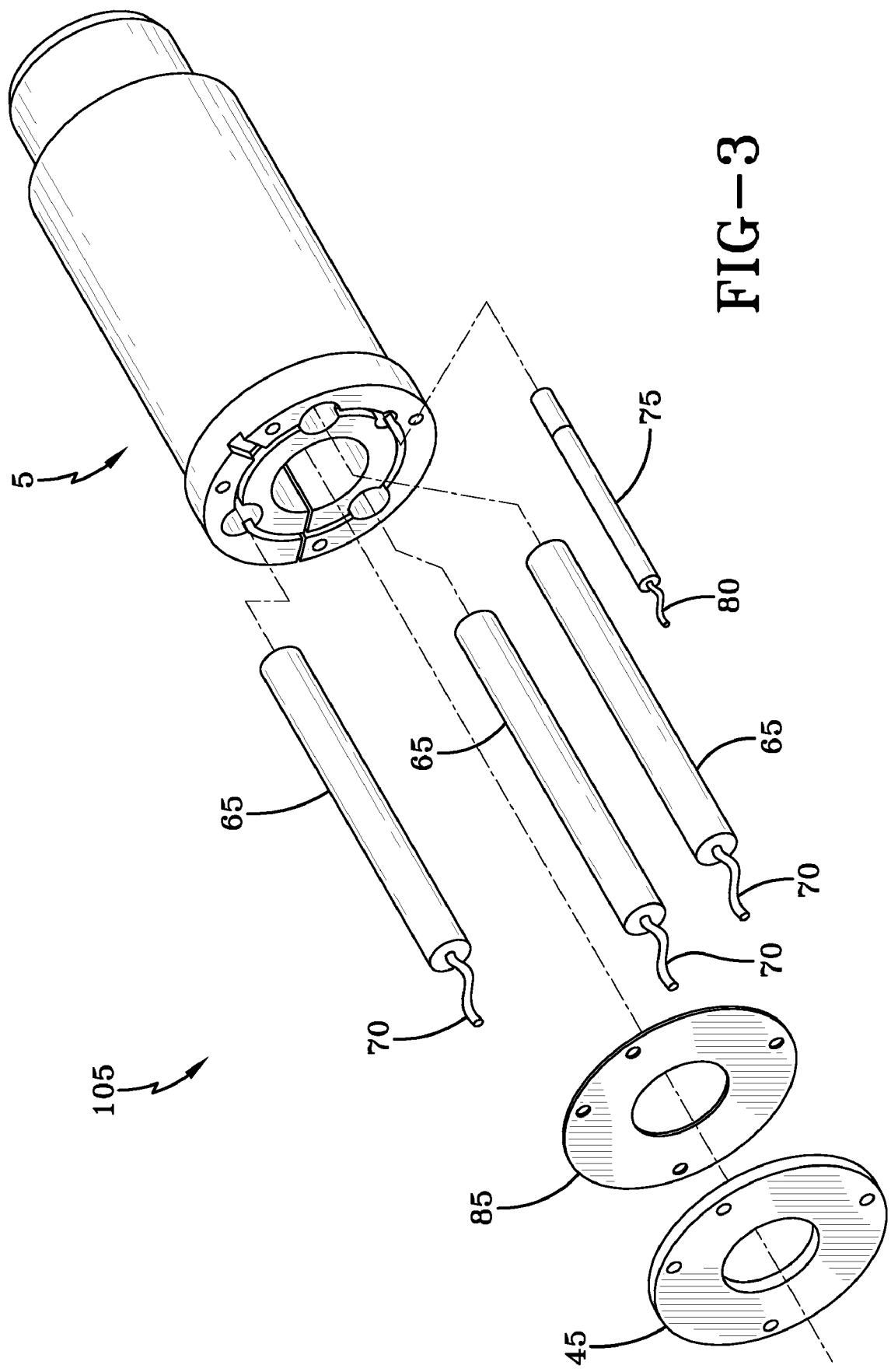
FIG. 3 is an exploded perspective view of a plastic injection machine nozzle heater of the present invention that makes use of the heater housing of FIG. 1.

As shown, the rearward end 15 of this heater body 5 includes a number of heater bores 25 that extend substantially longitudinally into the heater body. The heater bores 25 may run substantially parallel to the central axis of the heater body or may be at some angle with respect thereto. In this particular exemplary embodiment, three heater bores 25 are shown to be present. However, it is to be understood that a fewer or greater number of heater bores may be present in other embodiments of the present invention. As is described in more detail below and as illustrated in FIG. 3, the heater bores 25 are provided to receive associated cartridge heaters 65 for heating an injection machine nozzle.

A thermocouple bore 30 may also extend substantially longitudinally into the heater body 5. The thermocouple bore 30 may extend into the heater body 5 in any manner described above with respect to the heater bores 25. Alternatively, a thermocouple bore could extend radially into a wall of the heater body 5, although such a design may increase the likelihood of thermocouple or thermocouple wire damage. As is described in more detail below, the thermocouple bore 30 is provided to receive an associated thermocouple 75 for permitting the monitoring and control of injection machine nozzle temperature.

A wire receiving groove 35 may be carved into rear face 15*a* of the heater body 5 to retain the wires 70, 80 of the heaters and thermocouple 65, 75 residing in the respective bores 25, 30. Although the wire receiving groove 35 of this particular heater body embodiment 5 is a circular groove that passes through each of the heater bores 25 and thermocouple bore 30, it would be apparent to one of skill in the art that such a wire receiving groove may be of various other designs.

A wire passage slot 40 is preferably provided in the rear face 15*a* of the heater body 5 to permit exit of the heater and thermocouple wires 70, 80 therefrom. Alternatively, a hole or other aperture may be provided through a cover plate 45 (described below) or through a wall of the heater body 5 for this purpose.

The heater housing 1 also preferably includes a cover plate 45 that is adapted for attachment to the rear face 15*a* of the heater body 5. Like the heater body 5, the cover plate 45 includes a thru-bore 50 for receiving the injection machine nozzle to which the heater body will be installed. In this particular embodiment of the heater body 5, the cover plate 45 is provided with a number of thru-holes 55 through which associated threaded fasteners (not shown) may be passed. Corresponding threaded bores 60 are located in the rear face 15*a* of the heater body 5 for receiving the threaded fasteners and securing the cover plate to the heater body. As would be apparent to one of skill in the art, various other techniques for securing the cover plate 45 to the heater body 5 may also be employed. For example, the cover plate 45 and rear face 15*a* of the heater body 5 may be adapted for threaded engagement. An optional gasket 85 or another sealing element capable of withstanding high temperatures may be inserted between the cover plate 45 and the heater body 5 if desired.

An injection machine nozzle heater 105 employing the nozzle heater housing 1 of FIG. 1 is illustrated in FIG. 3. As can be understood from FIG. 3, cartridge heaters 65 and a thermocouple 75 are installed to the respective bores 25, 30 in the heater body 5, and the wires 70, 80 extending from the exposed ends thereof may be routed through the wire receiving groove 35 to the wire passage slot 40, where the wires may exit the heater body and be routed to a heater controller or other appropriate device. Cartridge heaters would be well known to one of skill in the art and need not be described in detail herein. Briefly, however, cartridge heaters are resistive heaters that are designed to conductively heat solid materials by being placed in close tolerance receiving holes. Cartridge heaters are available from a wide variety of vendors including, among others, Omega Engineering, Inc., Vulcan Electric Co., and Watlow.

While the heater 105 is shown to include three cartridge heaters 65, it is to be understood that a lesser or greater number of cartridge heaters may be used depending on the injection machine nozzle to which the heater will be installed and the heating requirements thereof. Further, it should also be understood that not all of the cartridge heater bores present in a given heater body must be filled with a cartridge heater.

Once the cover plate 45 is subsequently secured to the heater body 5, a heater 105 of sealed and durable construction is produced. That is, once the cover plate 45 is installed, the cartridge heaters 65 and thermocouple 75 are substantially protected from molten plastic and other external contaminants or damage, and a smooth and substantially continuous outer surface is presented that resists the buildup of plastic material and facilitates the removal of plastic therefrom. It may be possible to create and operate an injection machine nozzle heater of the present invention without such a cover plate, however, it should be apparent that such a heater would be more prone to damage than a heater employing a cover.

To that end, the heater and thermocouple wires 70, 80 extending from the heater body 5 through the wire passage slot 40 may be covered in a protective sheath in order to further minimize any potential for damage thereto. If desired, any gaps or voids between the wires 70, 80 and the wire passage slot 40 may be filled with an appropriate sealant.

Exemplary embodiments of a plastic injection machine nozzle heater housing and heater of the present invention have been described in detail above. However, it should be apparent to one of skill in the art that various changes to these exemplary embodiments may be made while still practicing the invention. Therefore, the scope of the invention is not to be considered limited by the disclosure of said exemplary embodiments, and many modifications thereto are possible without departing from the spirit of the invention as evidenced by the following claims:

What is claimed is:

1. An injection machine nozzle heater housing for an injection machine having a barrel assembly that terminates at a forward end in an elongate cylindrical injection nozzle, comprising:
    a cylindrical heater body having a forward end and a rearward end;
    an axial bore extending through said heater body, said axial bore of a diameter that allows passage of an injection nozzle through said heater body;
    at least one heater bore extending longitudinally into said heater body from a rear face thereof, said at least one heater bore for receiving a removable cartridge heater;
    a thermocouple bore extending into said heater body, said thermocouple bore for receiving a removable thermocouple; and
    a cover plate adapted for attachment to said rear face of said heater body, said cover plate having an axial thru-bore for allowing passage of an injection machine nozzle into said heater body and adapted to cover said at least one heater bore and said thermocouple bore.

2. The heater housing of claim 1, further comprising a wire receiving groove in said rear face of said heater body for receiving and routing heater wires after installation of a heater (s) into said heater body.

3. The heater housing of claim 2, wherein said thermocouple bore extends into said heater body from a rear face thereof and said wire receiving groove is further adapted to receive and route thermocouple wires after installation of a thermocouple into said heater body.

4. The heater housing of claim 1, further comprising at least one wire passage aperture for allowing heater and thermocouple wires to extend from said heater body after installation thereto.

5. The heater housing of claim 1, further comprising a radial expansion slit passing through said heater body along the length thereof.

6. The heater housing of claim 5, wherein said heater body includes at least one recessed fastener receiving bore for receiving a threaded fastener used to draw together said expansion slit.

7. The heater housing of claim 1, further comprising a gasket for installation between said cover plate and said rear face of said heater body.

8. The heater housing of claim 1, wherein said heater body includes three concentrically arranged and substantially evenly spaced heater bores, each of which contains a removable cartridge heater.

9. The heater housing of claim 1, wherein said heater body has a substantially smooth outer surface.

10. An injection machine nozzle heater housing for an injection machine having a barrel assembly that terminates at a forward end in an elongate cylindrical injection nozzle, comprising:
   a cylindrical heater body having a forward end and a rearward end, said heater body of a length that is less than the length of an injection nozzle over which said heater body will be installed;
   an axial bore extending through said heater body, said axial bore of a diameter that allows passage of an injection nozzle through said heater body while positioning said heater body substantially concentrically around said injection nozzle;
   a plurality of heater bores extending substantially longitudinally into said heater body from a rear face thereof, said heater bores for receiving respective removable cartridge heaters;
   a thermocouple bore extending substantially longitudinally into said heater body from said rear face thereof, said thermocouple bore for receiving a removable thermocouple;
   a wire receiving groove in said rear face of said heater body for receiving and routing heater and thermocouple wires;
   a wire passage aperture for allowing heater and thermocouple wires to extend from said heater body after installation thereto; and
   a cover plate adapted for attachment to a rear face of said heater body, said cover plate having an axial thru-bore for allowing passage of an injection machine nozzle into said heater body and adapted to cover said heater bores and said thermocouple bore.

11. The heater housing of claim 10, further comprising a radial expansion slit passing through said heater body along the length thereof.

12. The heater housing of claim 11, wherein said heater body includes at least one recessed fastener receiving bore for receiving a threaded fastener used to draw together said expansion slit.

13. The heater housing of claim 10, further comprising a gasket for installation between said cover plate and said rear face of said heater body.

14. The heater housing of claim 10, wherein said heater body includes three concentrically arranged and substantially evenly spaced heater bores, each of which contains a removable cartridge heater.

15. The heater housing of claim 10, wherein said heater body has a substantially smooth outer surface.

16. An injection machine nozzle heater for an injection machine having a barrel assembly that terminates at a forward end in an elongate cylindrical injection nozzle, comprising:
   a housing, said housing further comprising:
      a cylindrical heater body having a forward end and a rearward end, said heater body of a length that is less than the length of an injection nozzle over which said heater body will be installed,
      an axial bore extending through said heater body, said axial bore of a diameter that allows passage of an injection nozzle through said heater body while positioning said heater body substantially concentrically around said injection nozzle,
      a plurality of heater bores extending into said heater body from a rear face thereof, said heater bores for removably receiving respective cartridge heaters,
      a thermocouple bore extending into said heater body from said rear face thereof, said thermocouple bore for removably receiving a thermocouple,
      a wire receiving groove in said rear face of said heater body for receiving and routing heater and thermocouple wires,
      a wire passage aperture for allowing heater and thermocouple wires to extend from said heater body after installation thereto, and
      a cover plate adapted for attachment to a rear face of said heater body, said cover plate having an axial thru-bore that allows an injection machine nozzle to pass therethrough and into said heater body and adapted to cover said heater bores and said thermocouple bore,
   a cartridge heater removably residing in at least one of said heater bores; and
   a thermocouple removably residing in said thermocouple bore;
      wherein, wires of said cartridge heater(s) and said thermocouple are routed in said wire receiving groove and extend from said heater housing through said wire passage aperture; and
      wherein said cartridge heater(s), said thermocouple, and the wires thereof in said wire receiving groove, are covered by said cover plate after said cover plate is secured to said heater body.

17. The heater of claim 16, further comprising a radial expansion slit passing through said heater body along the length thereof.

18. The heater of claim 17, wherein said heater body includes at least one recessed fastener receiving bore for receiving a threaded fastener used to draw together said expansion slit.

19. The heater of claim 17, further comprising a gasket for installation between said cover plate and said rear face of said heater body.

20. The heater of claim 16, wherein said heater body includes three concentrically arranged and substantially evenly spaced heater bores, each of which contains a removable cartridge heater.

* * * * *